United States Patent [19]
Flaherty

[11] Patent Number: 5,324,428
[45] Date of Patent: Jun. 28, 1994

[54] DISPOSABLE DIALYSIS APPARATUS

[75] Inventor: James E. Flaherty, Sherman Oaks, Calif.

[73] Assignee: Spectrum Medical Industries, Inc., Los Angeles, Calif.

[21] Appl. No.: 92,785

[22] Filed: Jul. 19, 1993

[51] Int. Cl.⁵ .................................................. B01D 61/30
[52] U.S. Cl. .................................... 210/232; 210/242.1; 210/644
[58] Field of Search ................... 210/644, 321.6, 242.1, 210/232

[56] References Cited

U.S. PATENT DOCUMENTS 4,828,706  5/1989  Eddleman ........................... 210/644

FOREIGN PATENT DOCUMENTS 2546500  4/1977  Fed. Rep. of Germany ...... 210/644

Primary Examiner—Frank Spear
Attorney, Agent, or Firm—Edgar W. Averill, Jr.

[57] ABSTRACT

A disposable dialysis apparatus suspended in a dialysate solution. The dialysis apparatus has a tubular membrane which is opened at the top and bottom. A closed base member and collar seals the bottom of the tubular membrane. An open upper member and collar is sealed to the top of the tubular membrane, and a cap may be affixed to the top of the open upper member to seal the contents.

7 Claims, 1 Drawing Sheet

DISPOSABLE DIALYSIS APPARATUS

BACKGROUND OF THE INVENTION

The field of the invention is laboratory apparatus and the invention relates more particularly to dialysis apparatus for separating smaller molecules from larger molecules in solution.

Various methods are known to perform dialysis operations. Often in research laboratories, it is desired to perform a dialysis operation on a relatively small volume of solution. One apparatus for carrying this out is shown in U.S. Pat. No. 4,960,521 assigned to the assignee of the present application. While this device is very useful, it is somewhat to difficult to fill, and also difficult to remove from the dialysate solution.

BRIEF SUMMARY OF THE INVENTION

It is an object of the present invention to provide a disposable dialysis apparatus which is easy to fill, and easy to remove from the dialysate solution.

The present invention is for a disposable dialysis apparatus suspended in a dialysate solution. The apparatus has a tubular membrane formed from a dialysis membrane which membrane is generally cylindrical and is open at the top and bottom. A closed base member has a cylindrical outer surface over which the open bottom of the tubular membrane is disposed. A bottom collar surrounds that portion of the tubular membrane which is disposed over the cylindrical outer surface portion of the closed base member which seals the open bottom of the tubular membrane. An open upper member also has a cylindrical outer surface portion over which the open top of the tubular membrane is disposed. A top collar seals the membrane to the open upper member. A weight is affixed to the closed base member to cause the apparatus to float with the bottom of the tubular membrane in a downwardly oriented position. Preferably the solution to be dialyzed is added to the interior of the tubular membrane but a small amount of air is left above the solution to cause the apparatus to float with its top above the dialysate for easy removal.

DESCRIPTION OF THE PREFERRED EMBODIMENTS

Figure 1:
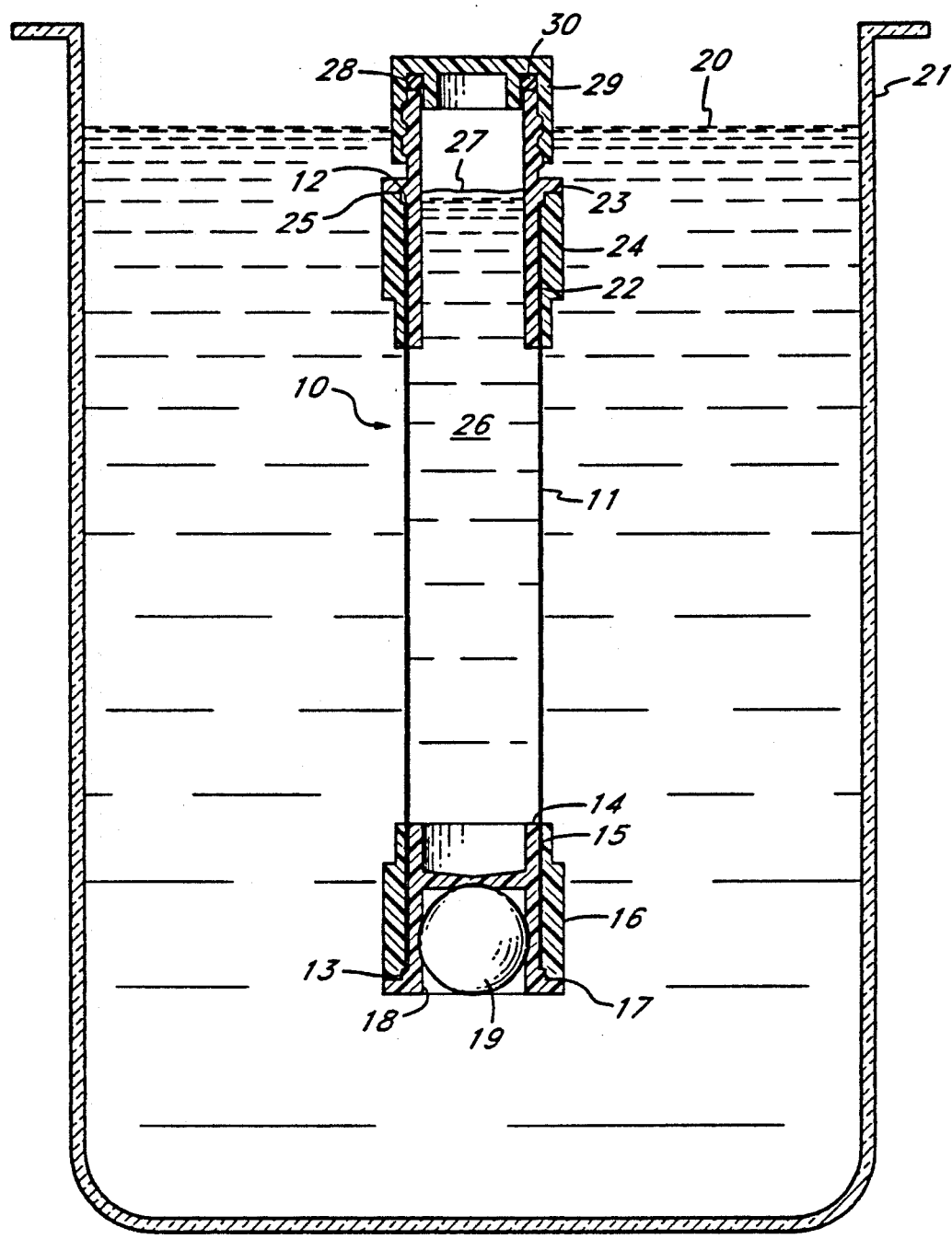
FIG. 1 is a cross-section side view of the dialysis apparatus of the present invention suspended in a dialysate held in a beaker.

The disposable dialysis apparatus of the present invention is shown in a cross-sectional side view in FIG. 1 and indicated generally by reference character 10. Apparatus 10 has a tubular membrane 11 which is formed from a dialysis membrane material. Tubular membrane 11 has an open top 12, an open bottom 13 which are sealed in a manner described below.

A closed base member 14 has a cylindrical outer surface portion 15 over which the bottom portion of tubular membrane 11 is disposed. A bottom collar 16 seals tubular membrane 11 to the cylindrical outer surface portion 15 of closed base member 14. Preferably bottom collar 16 is sonically welded or otherwise held to base member 14 as indicated at reference character 17.

Base member 14 has an inverted cup-shaped opening 18 into which a weight 19 is placed. Weight 19 should be sufficiently heavy to cause the apparatus to be suspended vertically in dialysate 20 held within beaker 21. It should not be so heavy that the apparatus is completely submerged and it is preferable that the top of the apparatus extends above the top of the dialysate as set forth in more detail below. It has been found that a weight made from teflon works well, although other substances such as glass or ceramic can alternatively be used.

The open top 12 of tubular membrane 11, is placed over the cylindrical outer surface portion 22 of open upper member 23. It is sealed to this cylindrical outer surface portion by top collar 24 which is preferably held to open upper member 23 by sonic welding as indicated by reference character 25. A solution to be dialyzed 26 has an upper surface 27, which is below the upper end 28 of open upper member 23. This provides an air space which helps assist the apparatus to float sufficiently high so that it may be easily removed from dialysate 20. A cap 29 is sealed to upper end 28 by O-ring 30 and cap 29 extends above the upper surface of dialysate 20.

In use, the cap 29 is removed from upper member 23 and solution 26 poured therein. Cap 29 is then replaced and the apparatus is dropped into a dialysate solution 20 and floats vertically as shown in FIG. 1 with a portion of cap 29 extending above the surface of dialysate 20.

Solution 26 contains differently sized molecules such that the tubular membrane 11 will allow the smaller molecules to pass freely therethrough, but prohibits the larger molecules from passing therethrough, providing a molecular-size cutoff point. Preferably, open upper member 23, top collar 24, closed base member 14, and bottom collar 16 are fabricated from polycarbonate. The assembly is relatively economical to fabricate and exceptionally easy to use.

The present embodiments of this invention are thus to be considered in all respects as illustrative and not restrictive; the scope of the invention being indicated by the appended claims rather than by the foregoing description. All changes which come within the meaning and range of equivalency of the claims are intended to be embraced therein.

What is claimed is:

1. A disposable dialysis apparatus suspended in a dialysate solution, said disposable dialysis apparatus comprising:

a tubular member formed from a dialysis membrane, said tubular member being generally cylindrical and having an open top and an open bottom;

a closed base member having a cylindrical outer surface portion over which the open bottom of said tubular membrane is disposed;

a bottom collar surrounding that portion of the tubular membrane which is disposed over the cylindrical outer surface portion of the closed base member, said bottom collar sealing the open bottom of the tubular membrane to the closed base member;

an open upper member having an upper and a lower end, said open upper member having a cylindrical outer surface portion near the lower end thereof over which the top of said tubular member is disposed;

a top collar surrounding that portion of the tubular member which is disposed over the cylindrical outer surface portion of the open upper member, said top collar sealing the open top of the tubular membrane to the open upper member and said top collar being unconstrained; and a weight affixed to said closed base member to cause the disposable dialysis apparatus to float freely with the bottom of the tubular membrane in a downwardly oriented position.

2. The disposable dialyzer apparatus of claim 1 further including a cap affixed to said open upper member, said cap enclosing a solution volume between said cap and said closed base member.

3. The disposable dialyzer apparatus of claim 2 wherein said solution volume contains a solution to be dialyzed and an air space above said solution to be dialyzed.

4. The disposable dialyzer apparatus of claim 3 wherein said weight is sufficient to cause the disposable dialyzer to float with its cap extending above the surface of the dialysate solution.

5. The disposable dialyzer apparatus of claim 1 wherein said closed base member, said bottom collar, said open upper member and said top collar are fabricated from a polycarbonate polymer.

6. The disposable dialyzer apparatus of claim 1 wherein said closed base member has an inverted cup-shaped opening and said weight is supported therein.

7. The disposable dialyzer apparatus of claim 6 wherein said weight is an object fabricated from poly tetra fluoro ethylene.

* * * * *